Figure 1:
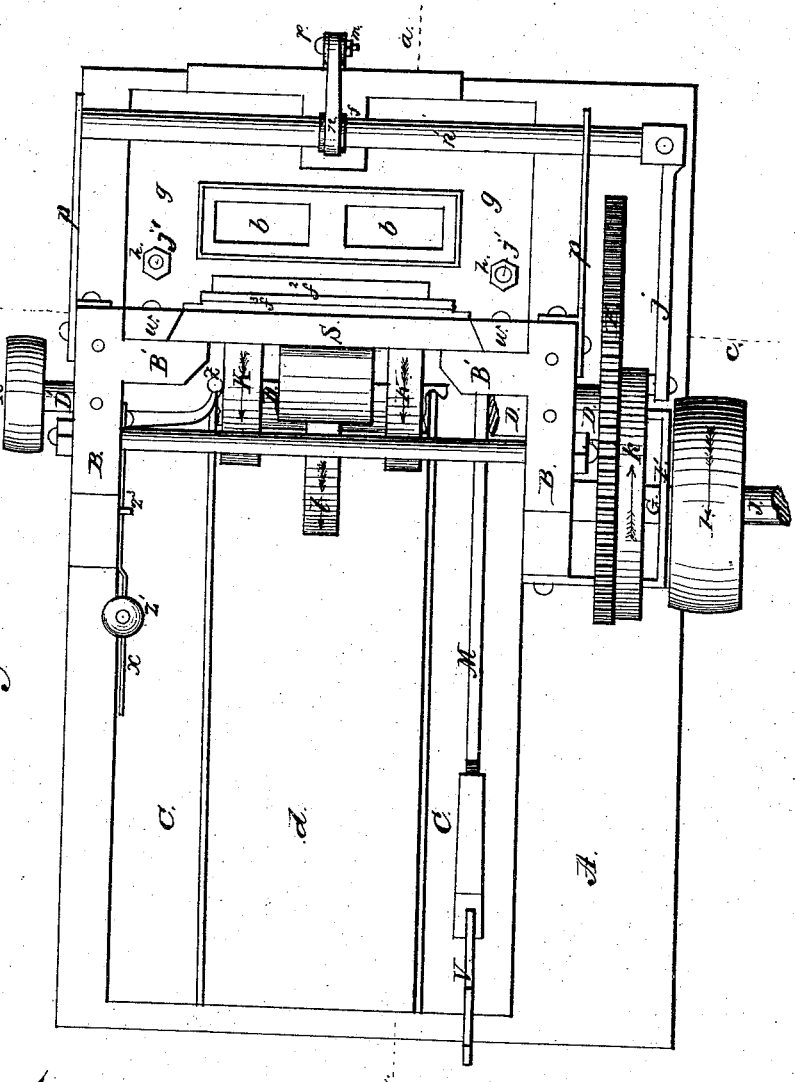

5 Sheets--Sheet 1.

J. ARMSTRONG.
Brick-Machines.

No. 156,966. Patented Nov. 17, 1874.

Attest:
Jas. F. Aglar
Chas L Clark

Inventor:
John Armstrong
By his Attorney
Wm. A. Clark

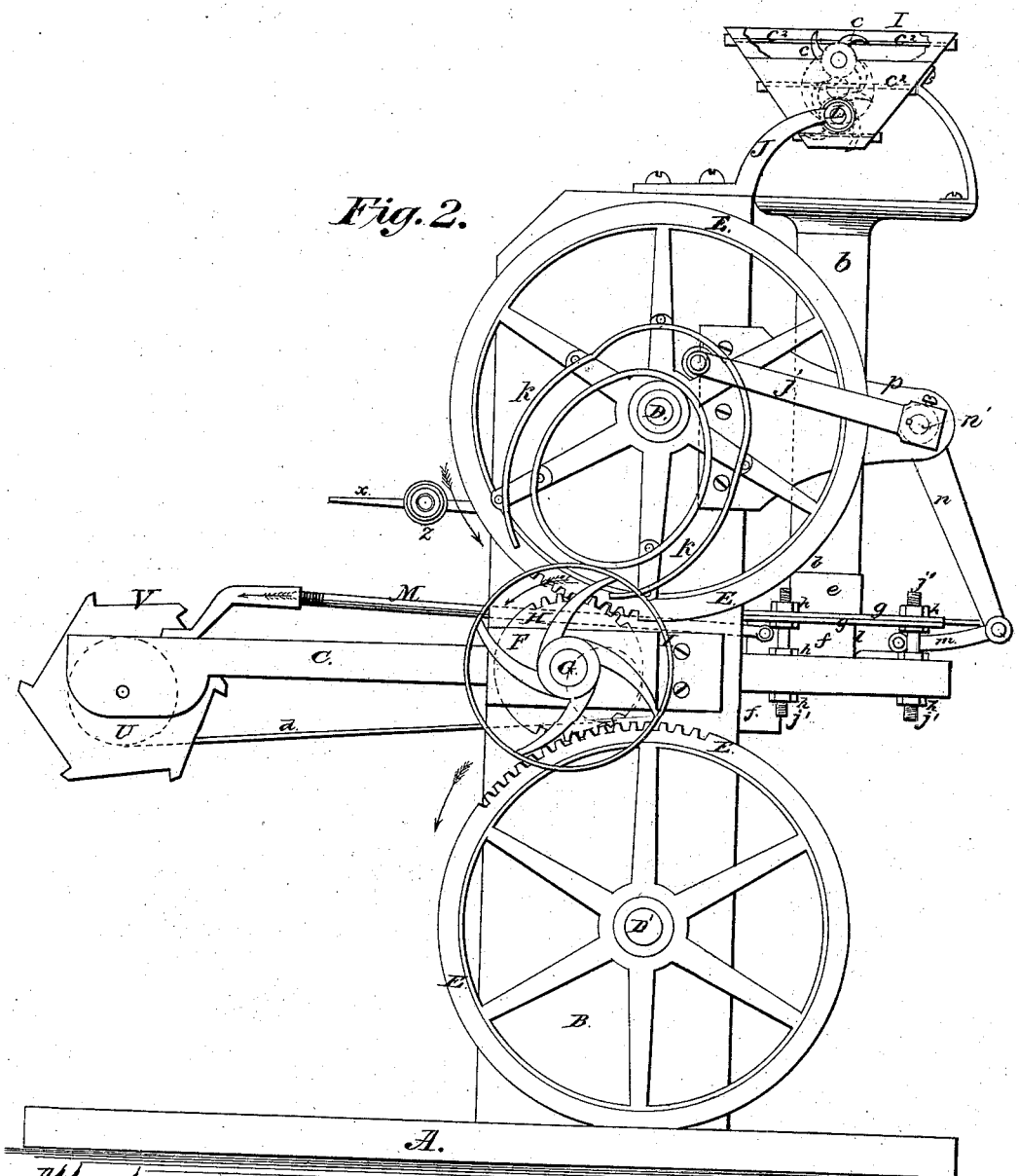

J. ARMSTRONG.
Brick-Machines.
No. 156,966.
5 Sheets--Sheet 3.
Patented Nov. 17, 1874.
FIG III
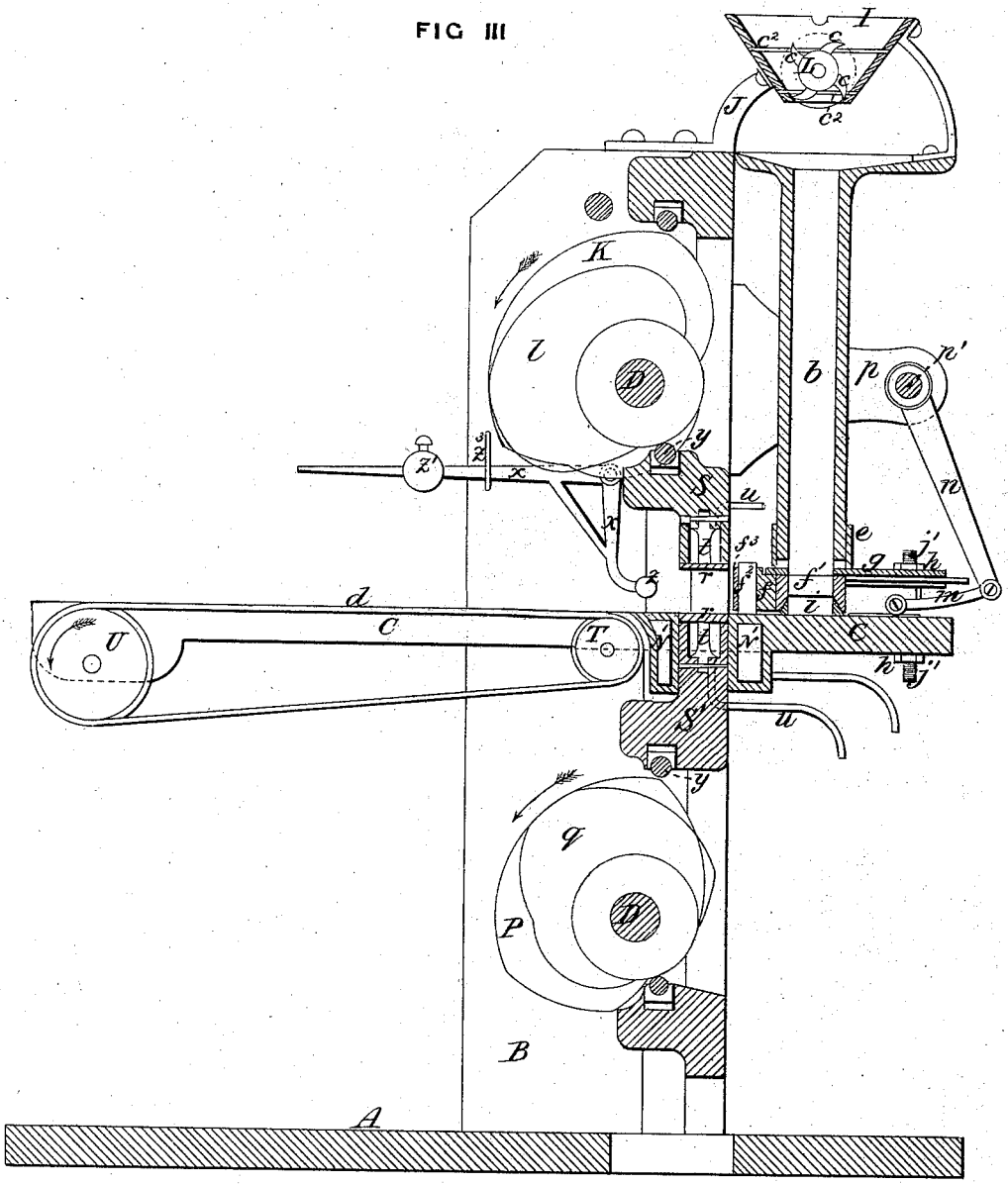
Attest
John E. Laing
J. H. Rutherford
Inventor
Jno. Armstrong
By Johnson and Johnson
Associate Att'ys 5 Sheets--Sheet 4.
J. ARMSTRONG.
Brick-Machines.
No.156,966. Patented Nov.17,1874.
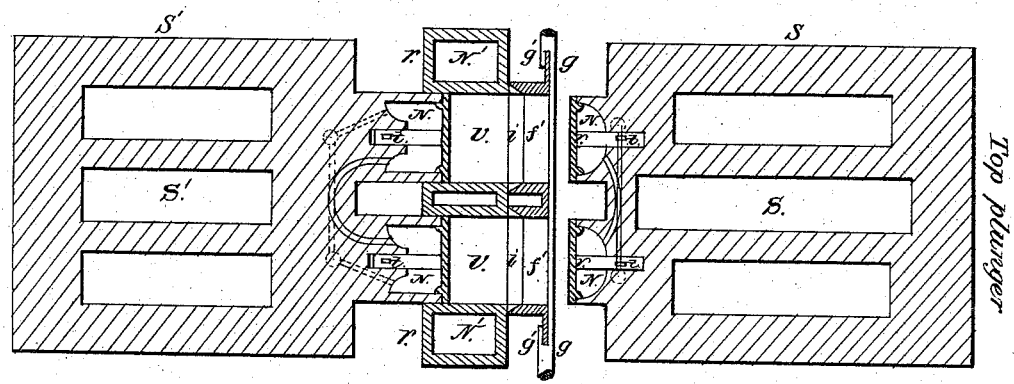
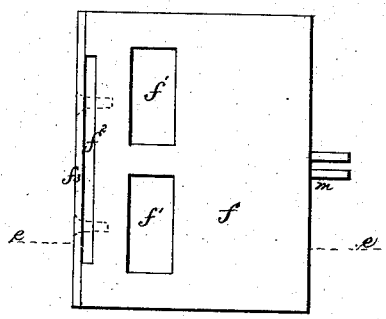
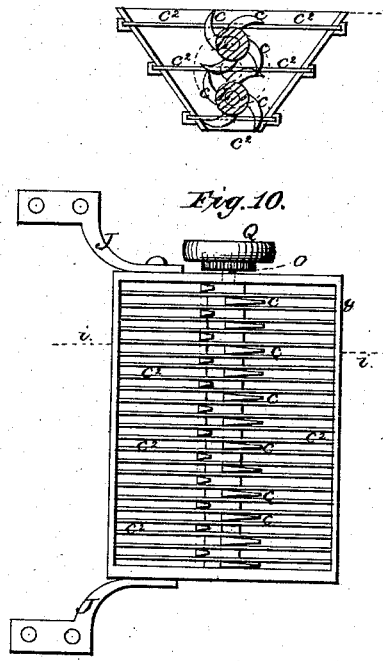
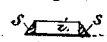
Attest: Inventor:

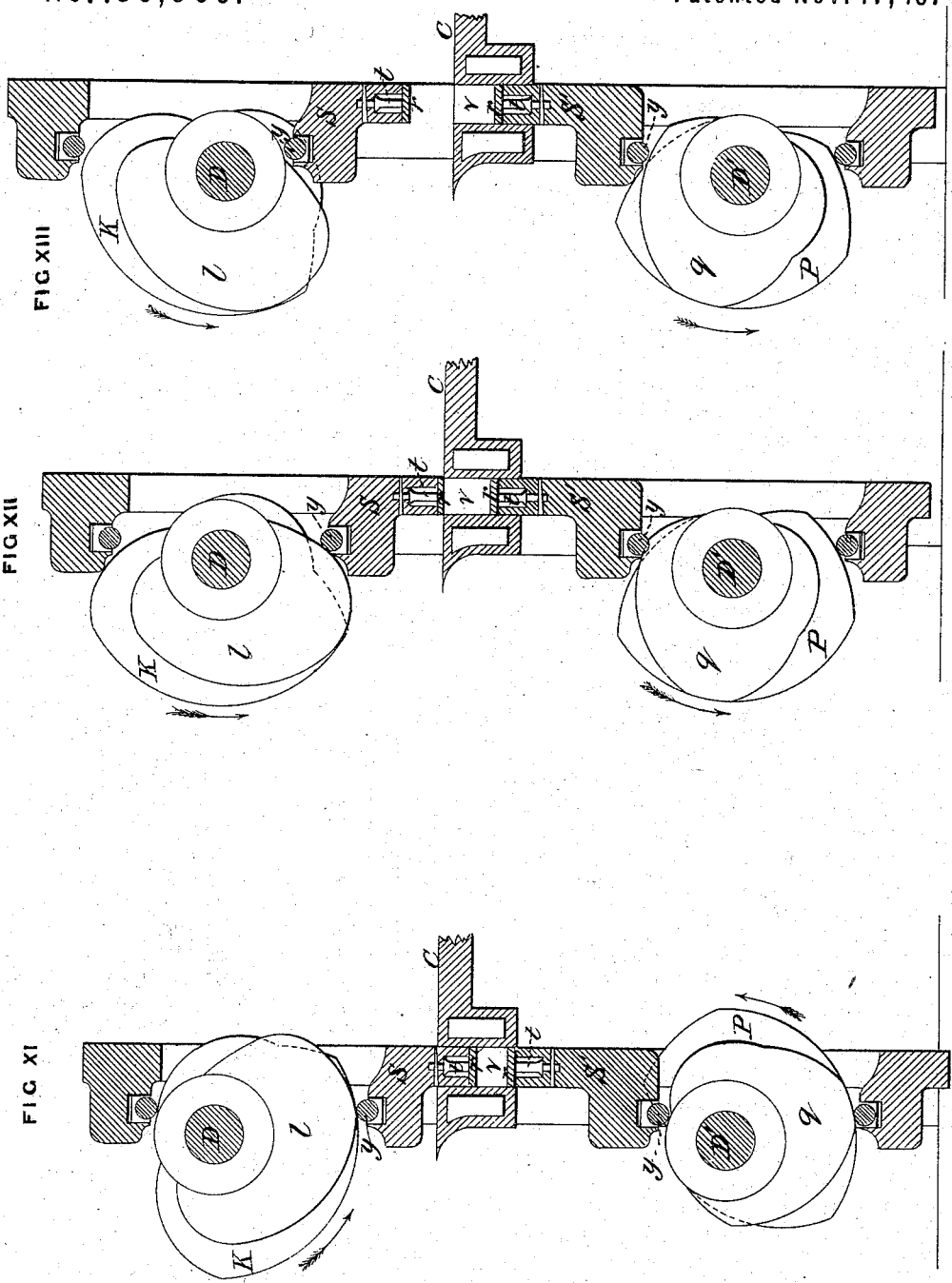

UNITED STATES PATENT OFFICE.

JOHN ARMSTRONG, OF ST. LOUIS, MISSOURI.

IMPROVEMENT IN BRICK-MACHINES.

Specification forming part of Letters Patent No. 156,966, dated November 17, 1874; application filed March 25, 1874.

*To all whom it may concern:*

Be it known that I, JOHN ARMSTRONG, of St. Louis, in the county of St. Louis and State of Missouri, have invented certain new and useful Improvements in Brick-Machines, of which the following is a specification:

My invention relates to that class of machines for making brick in which the clay is submitted to the action of plungers, which advance into the mold to form the bricks.

In a patent granted to me February 4, 1868, the movements of the plungers are designed to mold the bricks at a fixed point of rest between them while they are advancing and pressing the bricks from opposite sides. The clay is pressed into the molds directly beneath the hopper, and the molded bricks are discharged from the end of the mold opposite to that in which the clay is received.

My present improvements differ very essentially in the operation of the plungers from that described in my said patent. By my present invention, the clay is fed to the molds by a slide reciprocating between the ends of the plungers, and upon the advance of the slide, the moment the wiper, which it carries, passes over the ends of said plungers to clean them, the lower plunger descends to a point of partial rest toward the bottom of the molding-box, leaving it free to receive the clay; and, being at rest in this position, the upper plunger descends, and, by the construction of its operating-cams, partially presses the brick. The lower plunger then, by the construction of its center cam, recedes still farther with a slow movement until it reaches the open bottom of the molding-box. During this movement, by the construction of the upper cams, the upper plunger descends relatively faster than the lower one; consequently, the action of the plungers, while molding the brick or tile, is a descending advancing pressure, keeping the brick under continuous motion and pressure until the maximum pressure is reached. At this point in the revolution of the upper cam the two lower outside cams come into action and force the lower plunger upward relatively faster than the upper plunger is allowed to recede by its cam, and the brick is delivered at the top of the mold.

The advantages of pressing the brick while under the continuous motion, the plungers operating with unequal speed in the same direction, forms the brick or tile firm, compact, smooth, and full on its edges.

In the accompanying drawings, Figure 1, Sheet 1, represents a top view of a machine embracing my invention; Fig. 2, Sheet 2, a side elevation thereof; Fig. 3, Sheet 3, a vertical longitudinal section at the line $a\ a$ of Fig. 1; Fig. 4, Sheet 4, a vertical sectional view of the plungers, with the feeding-slide in position to deposit the clay into the molds; Fig. 5, same sheet, a top view of the slide; Fig. 6, same sheet, a vertical section of the feeding-slide, showing the automatic measuring base-rim of the receiving-chambers of said slide; Figs. 7 and 8, same sheet, top and sectional views of the automatic measuring base-rim; Fig. 9, same sheet, a sectional view of the receiving and preparing hopper for the clay; Fig. 10, same sheet, a top view thereof; Fig. 11, Sheet 5, a sectional view of the plungers, with the lower cam acting to raise the lower plunger; Fig. 12, same sheet, a similar view, with the upper plunger-cam acting to depress its plunger; and Fig. 13, same sheet, a similar view, with the plungers in position to receive the charge of clay.

The bed-plate A, vertical frame B, and the delivering-table frame C are constructed in any suitable manner. Above and below the table-frame C are arranged horizontal shafts D and D', journaled within the uprights, and carrying the operating-cams for the plungers. These cam-shafts are arranged vertically in line, and carry on their projecting ends, at one side of the frame, large cog-wheels E and E', each matching with an intermediate gear, H, on a short driving-shaft, G, supported in a bracket, F, and carrying also the fly-wheel. The brick-forming plungers S and S' are arranged to have a reciprocating movement between the uprights B upon guides B' and adjustable ways $w$, as shown in Fig. 1. The plungers are moved toward, with, and from each other, so as to be carried into, and the upper one withdrawn from, molds $v$ by the action of the cams, to be presently described. The acting faces of the plungers form heads to enter the molds in the table, and these heads may be of any form and number corresponding with the molds $v$, as shown in Fig. 4. The plunger-heads are provided with caps $r$, secured in place by keyed stems $t$, by which the caps may be kept tight in the cavities N, within which they are seated. These cavities N are for the admission of steam, by suitable pipes $u$ and ducts, to heat the caps $r$, while chambers N' are formed in the molding-box and surrounding the molding-compartments, for the admission of steam to heat the molds. The inlet and outlet tubes, for conducting the steam into and out of the plunger-heads, are of rubber, to admit of the movement of the plungers. The molding-box $v$ is placed transversely in line with the plungers, and may be made adjustable with the ways $w$ to keep the acting parts in line, so that the plunger-heads will enter the molds. The reciprocating movement of the plungers is produced by the revolutions of the cam-shafts D and D', the cams whereof, in the example shown, being arranged in triplicates, K and P being the outside cams, on their respective shafts, for imparting to the plungers their movement toward each other and into the molds, while the outward movement of the plungers from the molding-box is effected by cams $l$ and $q$, fixed on the shafts D and D' between their respective cams K and P. The plungers are not vertically in line with the axis of the cam-shafts; but the acting ends of the plungers are formed in side projections, wherein are secured anti-friction rollers $y$, the boxes whereof act against rubber springs fitted in recesses, in which the boxes are allowed to have a slight movement. These cams do not act to give simultaneous and equal movements to the plungers, but operate them at different times and with different speed, in a manner and for a purpose to be presently stated. The delivery-apron $d$ is arranged on one side of the mold-box, and the feeding-slide $f$ upon the other, the latter being arranged to slide between the table C and an adjustable plate, $g$, from the under side of which the feeding-slide $f$ is suspended by ways $g'$, Fig. 4, within and between which it slides, so as not to rest upon the table for support. The slide $f$ is provided with openings $f^1$, corresponding in size and form to the molds $v$, and of a depth sufficient to receive the quantity of clay to form the brick. The forward movement of the slide $f$ is regulated to bring these openings $f^1$ between the plungers and directly over the molds, as shown in Fig. 4, to deposit the clay received from the chute $b$ into the molds, while the backward movement of the slide $f$ is governed to bring its receiving-openings $f^1$ just beneath the chute $b$ to be filled, as shown in Fig. 3. The slide-carrying plate $g$ is supported in position by four screws, $j'$, passing through it and the table C, and provided with adjusting-nuts $h$ above the plate $g$ and beneath the table, as seen in Figs. 2 and 3, by which to adjust the plate and its slide vertically in relation to the surface of the table.

Now, as the bottoms of the slide-openings $f'$ are formed by the top of the table C, any vertical adjustment of the slide $f$ will increase or diminish the depth of the receiving-chambers $f^1$, which is designed to give a capacity to said chambers to regulate the measurement of the clay necessary to form a brick or tile of the proper thickness.

In order to preserve the continuity of the walls of the receiving-chambers $f^1$ with the top of the table C, I combine with said chambers a separate base-rim measure, $i$, which, resting upon the table C, forms an extension of the slide-chamber $f^1$, being fitted and held therein by its beveled sides $s$, Figs. 3, 6, and 8, bearing upon the corresponding beveled sides of the web which forms the receiving-chambers, and by this device $i$ the receiving-chambers $f^1$ are preserved intact in raising and lowering the slide to increase or diminish their capacity, and thereby produce a measure adapted to the nature of the clay in different localities, and which may be more or less compressible on account of their natural solidity and moisture as well as the changes of temperature. These are matters which it is very necessary to regard by admitting more or less clay in the chambers of the slide, and providing them with an automatically-adjustable section or base rim, $i$, to maintain the bottoms of the chambers upon the table, notwithstanding the feeding-slide may be raised more or less above the surface of said table.

The feeding-chute $b$ for the clay is suspended from the hopper and corresponds in form and size to the measuring-slide chambers, and it is supported above the slide-carrying plate with its end fitted into a shoe-piece or open socket, $e$, on the plate $g$, so that the latter may be adjusted vertically over said chute-socket, as shown in Fig. 3, like a telescoping joint.

The intermittently-reciprocating movements of the feeding-slide $f$ are effected by a link, $m$, pivoted to the slide $f$, and an arm, $n$, carried by a rock-shaft, $n'$, supported in brackets $p$ on the frame B, and from which shaft $n'$ an arm, $j$, extends with its free roller end fitting into and receiving the action of a compound cam, $k$, on the face of the upper cog-wheel E, so that this cam, by the devices stated, gives to the slide and the delivery-apron intermittent movements as each brick is formed and delivered.

The feeding-slide is provided on its front end with a wiper, $f^2$, of india-rubber or other suitable material, secured in place by a clamp-plate, $f^3$, so that its upper and lower edges project beyond the top and bottom of the slide for wiping off the face-plates $r$ of the plungers and keeping them clear as the slide passes between the plungers in its forward movement with the wipers in contact with their faces. As the slide advances to bring its receiving-chambers over the molding-boxes $v$ it suddenly strikes against a weighted arm, $x$, pivoted to the frame B, and the concussion produced by the blow causes the clay to descend from the slide-chamber $f^1$ into the molding-box.

On the point of contact with the lever I place a ball, $z$, to receive the blow, and on the horizontal arm of said lever I place a graduating-weight, $z^1$, to increase or diminish the resistance of the lever to the slide. A stop, $z^3$, holds the lever in position to be struck.

The hopper I for receiving and preparing the clay is supported by brackets J upon the frame B in a position directly over the chute. In this hopper I arrange one or more cylinders, L, armed with knives or teeth $c$, in a manner to allow them to pass between two or more partitions of grating-rods, $c^2$, placed horizontally in sockets in the sides of the hopper, so as to allow them to turn loosely therein by the turning of the knives, and thereby not only effect the cutting and pulverizing of the clay, but keep the grating-bars free from clogging. The grating-rods $c^2$ being cylindrical, and fitted loosely in their places, continually change their surface positions by the friction of the knives and the clay in their passage between the rods, and thereby free them from accumulating deposits of clay. The hopper-cylinder L is driven by a pulley, Q, on one end, over which a band passes to a pulley, R, Fig. 1, on the end of the lower cam-shaft D'.

It is obvious that the pulverizing-cylinders may be arranged in pairs, and be revolved in opposite directions, with their respective knives or arms passing between top, bottom, and intermediate grating bars $c^2$, as shown in Fig. 9, and that the cylinders, when so used, are connected by pinions $o$ with an intermediate pinion, as in Fig. 10, to give the opposite motions to the pair of cylinders.

The delivering-apron $d$ is mounted upon an inner and an outer drum, T and U, so as to be on a level with the top of the table C, and to extend from near the molding-box to receive the molded bricks therefrom and deliver them at the end of the table. It has an intermittent movement imparted to it by means of an arm, M, Figs. 1 and 2, pivoted to the feeding-slide $f$, and with its free end taking into a ratchet-wheel, V, on the end of the drum U, whereby each forward movement of the feeding-slide delivers the brick onto the apron, and moves the arm M outward, which turns the ratchet V, and carries the apron with the bricks outward from the molds each time the ratchet is turned. The inward movement of the slide $f$ therefore feeds the clay to the mold, carries the molded bricks from the molds, and moves them out of the way upon the apron. The feeding-slide $f$ having been moved forward with its chambers $f'$ over the molding-box $v$, the concussion received by the latter from the weighted lever $x$ causes the clay to discharge into the molds, and the slide recedes to again have its chambers filled from the chute. At this moment the upper plunger, S, descends, the molding-box molding and pressing the brick on the receding lower plunger, S', which rests on the receding portions of the cams P, Fig. 13, and gradually descends, while the upper plunger, S, is also descending into the molding-box, by the action of the cams K, the upper one, S, faster than lower, S', the increased motion giving pressure in descending, and, having reached its maximum descent, the brick is formed between plungers S and S', descending as described. The two plungers at this moment ascend in the molding-box $v$, the upper one slower than the lower one, S', to its line of relief, relatively the same as descending, described above, with this exception, that the plunger S has more stroke, and ascends out of the molding-box $v$, while the lower one, S', remains in the box $v$, its face rising on line with table C, to be wiped off in delivering the brick. At this moment the wiper passes over the faces of the plungers, and the lower plunger descends to receive the clay from the slide-chambers, and in this position the plungers remain, partially at rest, until the slide $f$ again moves back, when the plunger S advances into the molds, as before stated.

By the method of operating the plungers herein described brick or tile are produced from all ordinary varieties of clay without the introduction of steam or heated air into the cavities of the plungers and molding-box for heating them, as in my patent aforesaid; but, in consequence of clays being more or less glutinous or sticky, I construct the machine to use the molds and plungers heated or not, as may be necessary to successfully mold and press brick or tile from the different varieties of clays, movement being imparted to the slide by the cam $k$ and its connecting devices.

The peculiar construction of the cams is shown in Sheet 5, and by their operation the plungers are made to compress the clay and keep it in motion under pressure until the molded bricks are relieved from pressure and delivered upon the delivery-apron.

It is obvious that fire-clay and clays of similar glutinous properties require more preparation than common clays before molding, and I design to use two or more cylinders with tiers of grating-bars in the preparing hopper, as may be desirable, but for ordinary clays one cylinder with two sets of grating is found sufficient.

I claim—

1. In a machine for making brick, the combination of the chambered slide $f f^1$ thereof, which feeds the clay to the mold, with an automatic base-rim measure, $i$, and the table C, which forms the bottom to said rim measure, whereby the area of the feeding-chambers $f^1$ may be increased or diminished in depth, for the purpose stated.

2. The combination of a feeding-slide, $f$, the chambers $f^1$ whereof are provided with automatic base-rim measures $i$, and the table C, with an adjustable plate, $g$, which carries said chambered slide $f f^1$, whereby the latter may be adjusted vertically to cause the base-rim $i$ to increase or diminish the depth of the slide-chambers, as may be required.

3. The wiper $f^3$, in combination with the feeding-slide $f$, and the plungers S and S', whereby the acting face-plates of the latter are kept free and clean of adhering clay.

4. The weighted pivoted arm $x$, in combination with the feeding-slide $f$, whereby the latter is struck in its advance movement to effect the discharge of the clay from its chambers by the concussion produced by the sudden contact of the moving slide with the weighted lever.

5. The combination of the cam $k$, arms $j\ n$, and link $m$ with the feeding-slide $f$, whereby the latter is operated in connection with the different movements of the plungers, as and for the purpose described.

5. The combination, with the plungers S and S', of their respective cams K P $l\ q$, having a construction to give to the upper plunger S a relative faster descent into the molding-box $v$ than the descent of the lower plunger S', upon which the brick is molded and pressed while in motion between the two, substantially as described.

7. The lower plunger S', having a rest or stop movement in its first descent to receive the clay, and a regular faster ascent, in combination with the upper plunger S, having a relative slower ascending movement, as and for the purpose set forth.

8. The combination of the cylinder or cylinders L of knives or arms $c$ with the grating $c^2$ of the hopper I, substantially as and for the purpose described.

9. The hopper grating-rods $c^2$, arranged loosely in their beds or sockets, and with spaces between them for the operation of the knives or arms, for the purpose stated.

10. The suspended chute $b$, in combination with the adjustable plate $g$, which carries the feeding-slide, and with a socket, $e$, with which said chute telescopes, whereby the feeding-slide and its carrying-plate may be adjusted vertically, independent of the hopper-chute.

11. The delivery-apron $d$, in combination with the feeding-slide $f$, arm M, and ratchet V, whereby the advance of the slide to deliver the molded brick advances at the same time and by the same movement of the apron to carry it out of the way, as described.

JOHN ARMSTRONG.

Attest:
JAS. F. AGLAR,
CHAS. L. CLARK.